(12) United States Patent
Kerxhalli et al.

(10) Patent No.: US 8,174,735 B2
(45) Date of Patent: May 8, 2012

(54) SYSTEM AND METHOD FOR PRINTING SYSTEM PROCESS MAGNIFICATION ADJUSTMENT

(75) Inventors: David Mark Kerxhalli, Rochester, NY (US); James W. Stevens, Rochester, NY (US); Thomas M. Baretsky, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 959 days.

(21) Appl. No.: 12/177,376

(22) Filed: Jul. 22, 2008

(65) Prior Publication Data

US 2010/0020364 A1    Jan. 28, 2010

(51) Int. Cl.
*H04N 1/04* (2006.01)
*B41J 2/47* (2006.01)

(52) U.S. Cl. ........................ 358/474; 347/225

(58) Field of Classification Search .............. 347/247, 347/116; 399/309, 298, 374, 16; 101/485; 358/1.1, 474; 271/186; 359/216
See application file for complete search history.

(56) References Cited

U.S. PATENT DOCUMENTS

| | | | | |
|---|---|---|---|---|
| 4,278,344 A * | 7/1981 | Sahay | ............................ | 399/374 |
| 5,555,084 A * | 9/1996 | Vetromile et al. | .............. | 399/16 |
| 5,970,295 A * | 10/1999 | Samizo | .......................... | 399/309 |
| 6,389,260 B1 * | 5/2002 | Kataoka et al. | ............... | 399/298 |
| 6,419,222 B1 * | 7/2002 | Morrison et al. | ............. | 271/186 |
| 6,456,310 B1 * | 9/2002 | Wallace et al. | ............... | 347/116 |
| 6,529,643 B1 | 3/2003 | Loce et al. | | |
| 6,814,004 B2 * | 11/2004 | Lofthus et al. | ................ | 101/485 |
| 6,816,269 B1 | 11/2004 | Loce et al. | | |
| 6,920,307 B2 | 7/2005 | Howe | | |
| 7,039,348 B2 | 5/2006 | Kerxhalli et al. | | |
| 7,158,751 B2 | 1/2007 | Howe | | |
| 7,272,334 B2 | 9/2007 | Moore et al. | | |
| 7,277,669 B2 | 10/2007 | Howe | | |
| 2006/0092264 A1 | 5/2006 | Matsuzaki et al. | | |
| 2006/0099019 A1 | 5/2006 | Howe | | |
| 2007/0047048 A1 * | 3/2007 | Shimizu | ........................ | 359/216 |
| 2007/0139715 A1 | 6/2007 | Kazama et al. | | |
| 2008/0278735 A1 | 11/2008 | Wang et al. | | |
| 2010/0020364 A1 | 1/2010 | Kerxhalli et al. | | |
| 2010/0046033 A1 | 2/2010 | Kulkarni et al. | | |
| 2010/0309526 A1 | 12/2010 | Kulkarni et al. | | |
| 2011/0149302 A1 * | 6/2011 | Stevens et al. | ................. | 358/1.1 |

\* cited by examiner

*Primary Examiner* — Stephen Meier
*Assistant Examiner* — Carlos A Martinez
(74) *Attorney, Agent, or Firm* — Fay Sharpe LLP

(57) ABSTRACT

Document processing systems and duplex printing methods are presented in which side 1 to side 2 process magnification errors are compensated for by selective use of two raster output scanner clocks for latent image generation of images destined for first and second sides of a printed substrate, with the second clock speed being increased to compensate for substrate shrinkage due to fusing station heating for two-sided printing.

14 Claims, 4 Drawing Sheets

SYSTEM AND METHOD FOR PRINTING SYSTEM PROCESS MAGNIFICATION ADJUSTMENT

BACKGROUND

The present exemplary embodiment relates to document processing systems such as printers, copiers, multi-function devices, etc., and more particularly to mitigation of side 1 to side 2 process magnification errors (sometimes referred to as "show-thru" or "see-thru error) in printing engines and duplex printing methods for printing images on two sides of a printed substrate. This form of magnification error is seen as a difference in the image size for images printed on two different sides of a printed substrate, and is unacceptable in many customer applications. Show-thru errors are mainly cause by the substrate shrinking when fed through a fusing station after the image is transferred to the first side of the substrate and before an image is transferred to the second side. In particular, conventional duplex printing systems include a duplex routing station and media inverter downstream of the fusing station that reintroduce a printed sheet into the transfer path before the once-printed sheet has had time to be reacclimated to the ambient temperature. The side 2 image is then transferred to the shrunken paper and becomes larger relative to the side 1 image once the paper resumes the original size. This results in a process magnification error evident as a show-thru discrepancy between the image sizes on either side of the substrate, with the side 2 image appearing larger than the side 1 image in the process direction. The error can be addressed somewhat by shifting the margin for the side 2 image in order to evenly distribute the magnification error equally on both sides. However, this approach does not reduce the process magnification error, but instead makes it less apparent upon visual inspection. Image data may be manipulated to artificially shrink the side 2 image, for instance, by removing certain data, but this leads to image defects. Consequently, a need remains for improved printing systems and duplex printing techniques by which the adverse effects of side 1 to side 2 process magnification errors can be mitigated.

BRIEF DESCRIPTION

The present disclosure provides document processing systems and printing methods that may be employed to address the above mentioned shortcomings of conventional duplex printing systems by selective use of different scanning speeds for generating latent images on a photoreceptor for images destined for different sides of a printed substrate. The concepts of the disclosure can be advantageously employed to compensate for show-thru error without image distortion effects by selectively operation using two different raster output scanner (ROS) clocks for latent image generation of images destined for different sides of a printed sheet, with the second clock speed used on side 2 images being increased to compensate for substrate shrinkage during fusing for two-sided printing. This concept can be implemented to accurately correct show-thru errors due to paper shrinkage or any other process magnification effect while avoiding image defects associated with image data manipulation techniques.

In accordance with one or more aspects of the present disclosure, a document processing system is provided, which is comprised of a photoreceptor, such as a belt or drum that continuously moves along a closed path, with two or more raster output scanners (ROSs) located along the path of the photoreceptor, where each ROS is operable to generate a latent image on a portion of the photoreceptor based on a clock input. Corresponding developers are provided downstream of the associated ROSs to develop toner of a given color on the latent image and a transfer station is located downstream of the ROSs for transfer of developed toner from the photoreceptor directly or indirectly to a substrate traveling along a first substrate path. The system also includes a fusing station for fixing the transferred toner to the substrate, a duplex router to selectively direct the substrate along a second path, and a media inverter to invert the substrate and to return it to the first path upstream of the transfer station for two-sided printing operation. The system further comprises first and second clocks providing corresponding output signals to the ROSs, and a controller coupled with the ROSs to selectively operate a given ROS according to the first clock signal if the latent image being generated by the given ROS is to be fixed to a first side of the substrate or according to the second clock signal if the latent image being generated by the given ROS is to be fixed to a second side of the substrate.

In further aspects of the disclosure, the second clock is adjustable, and is preferably adjusted such that the frequency ratio of the first and second clocks corresponds to a side 1 to side 2 process magnification for the system measured using the first clock. In this manner, the adverse effects of side 1 to side 2 magnification error can be mitigated or avoided, whether attributable to substrate shrinkage in the fuser or other causes. In certain embodiments, moreover, the photoreceptor may include two or more image panel zones in which the ROSs generate latent images, with successive panel zones separated by inter panel zones. In this case, the controller may provide the individual ROSs with a control parameter indicating whether a latent image to be generated on an upcoming panel zone is to be ultimately fixed to a first side or a second side of the substrate. The individual ROSs then select one of the two clock output signals for use in generating a latent image on the upcoming panel zone based on the control parameter.

In accordance with other aspects of the disclosure, a raster output scanner (ROS) is provided for generating a latent image on a portion of a photoreceptor traveling along a closed path. The ROS is comprised of a light source, such as an LED laser, that generates light according to image data, a scanning mechanism that directs light from the light source toward a photoreceptor according to a selected clock input, a first clock input, a second clock input, and a clock select component that selectively connects one of the first and second clock inputs to the selected clock input according to a select input. In certain embodiments, the ROS scanning mechanism is a motor polygon assembly (MPA) having a plurality of facets rotating about an axis at a speed set by the selected clock input for scanning light from the light source across a portion of the photoreceptor.

In accordance with still further aspects of the present disclosure, a duplex printing method is provided, which includes receiving image data for print job pages and selectively generating latent images on panel zone portions of a photoreceptor that continuously moves along a closed path using a plurality of ROSs positioned along the path. The latent image is generated by a given one of the ROSs by selectively operating the given ROS according to the first clock signal if the latent image is to be fixed to a first side of a substrate or according to the second clock signal if the latent image is to be fixed to a second side of the substrate. The method also includes developing toner of a given color on the latent images on the photoreceptor, transferring developed toner to a substrate traveling along a first substrate path, fixing the transferred toner to the substrate, and for two-sided printing, selectively directing the substrate along a second path, inverting the substrate, and returning the inverted substrate to the first path upstream of the transfer station.

Certain embodiments of the disclosed method may further include measuring a side 1 to side 2 process magnification using the first clock and adjusting the second clock based on the measured side 1 to side 2 process magnification. In one preferred implementation, the second clock is adjusted such that a frequency ratio of the first and second clocks corresponds to the measured side 1 to side 2 process magnification. In addition, where the photoreceptor includes a number of image panel zones in which the ROSs generate latent images, the method may also include providing a first clock output signal from the first clock to each of the ROSs, providing a second clock output signal from the second clock to each of the ROSs, providing the individual ROSs with a control parameter indicating whether a latent image to be generated on an upcoming panel zone is to be fixed to a first side or a second side of the substrate, and selecting one of the clock output signals for use at individual ROSs in generating a latent image in the upcoming panel zone based on the control parameter. The control parameter is preferably provided prior to the end of the inter panel zone preceding the upcoming panel zone, and the method may include allowing the selected clock output signal to settle before generating the latent image in the upcoming panel zone.

BRIEF DESCRIPTION OF THE DRAWINGS

The present subject matter may take form in various components and arrangements of components, and in various steps and arrangements of steps. The drawings are only for purposes of illustrating preferred embodiments and are not to be construed as limiting the subject matter.

DETAILED DESCRIPTION

Figure 1:
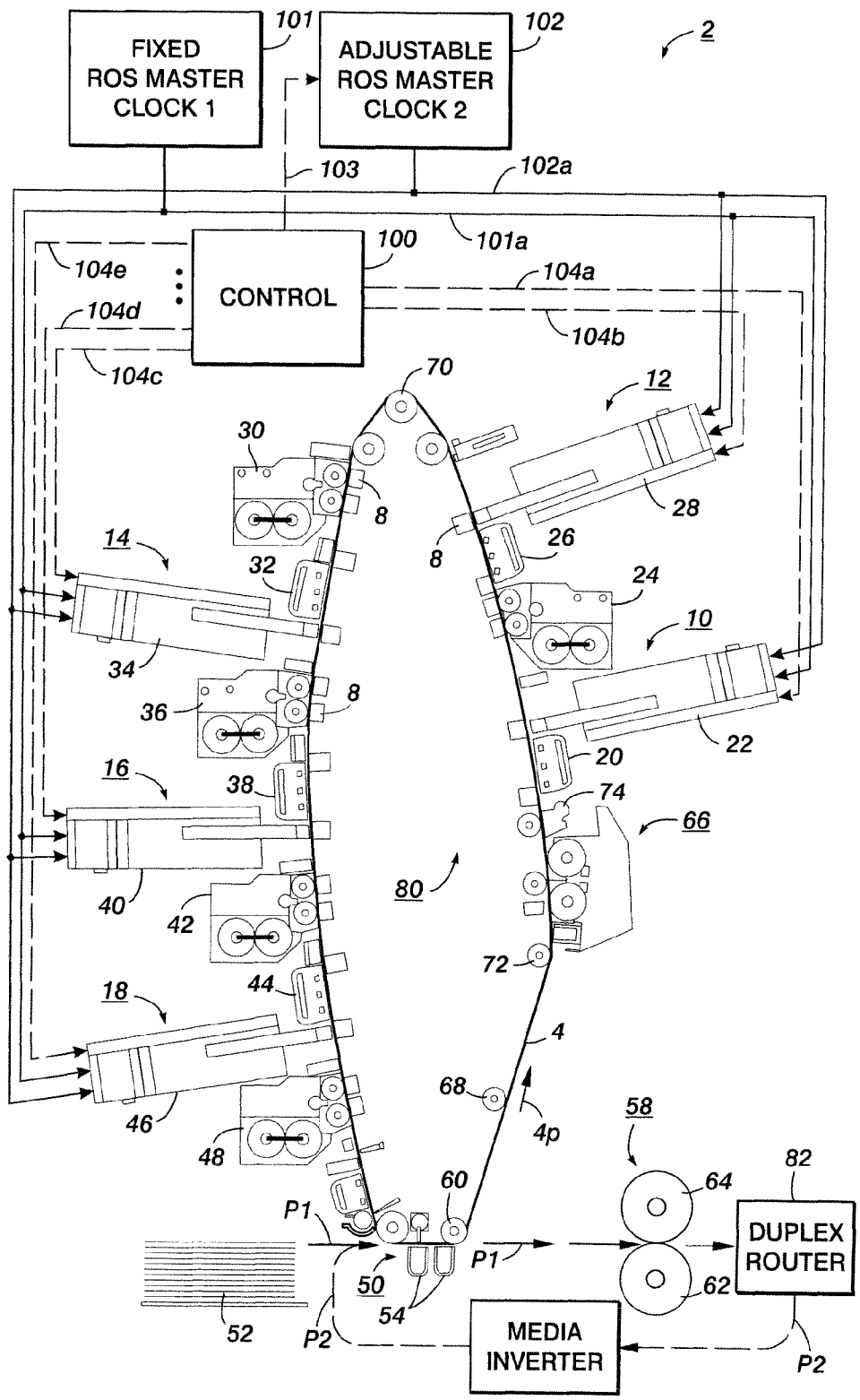
FIG. 1 is a simplified schematic diagram illustrating an exemplary multi-color document processing system with a plurality of selectively adjustable ROSs in accordance with one or more aspects of the present disclosure.

Referring now to the drawing figures, several embodiments or implementations of the present disclosure are hereinafter described in conjunction with the drawings, wherein like reference numerals are used to refer to like elements throughout, and wherein the various features, structures, and graphical renderings are not necessarily drawn to scale. The disclosure relates to correction of process magnification errors in document processing systems and is hereinafter illustrated in the context of an exemplary multi-color document processing system having five raster output scanners and corresponding developers situated around a photoreceptor belt traveling at a generally constant speed along a circuitous closed path, although the various aspects of the disclosure can be implemented in association with systems employing any number of ROSs and using any form of intermediate transfer medium, including without limitation photoreceptor belts, drums, and the like. Moreover, the concepts of the present disclosure find utility in association with printing systems that include multiple transfer stages prior to printing on a final print media, wherein implementations of the disclosed concepts in any such alternate systems are contemplated as falling within the scope of the present disclosure and the appended claims.

Figure 2:
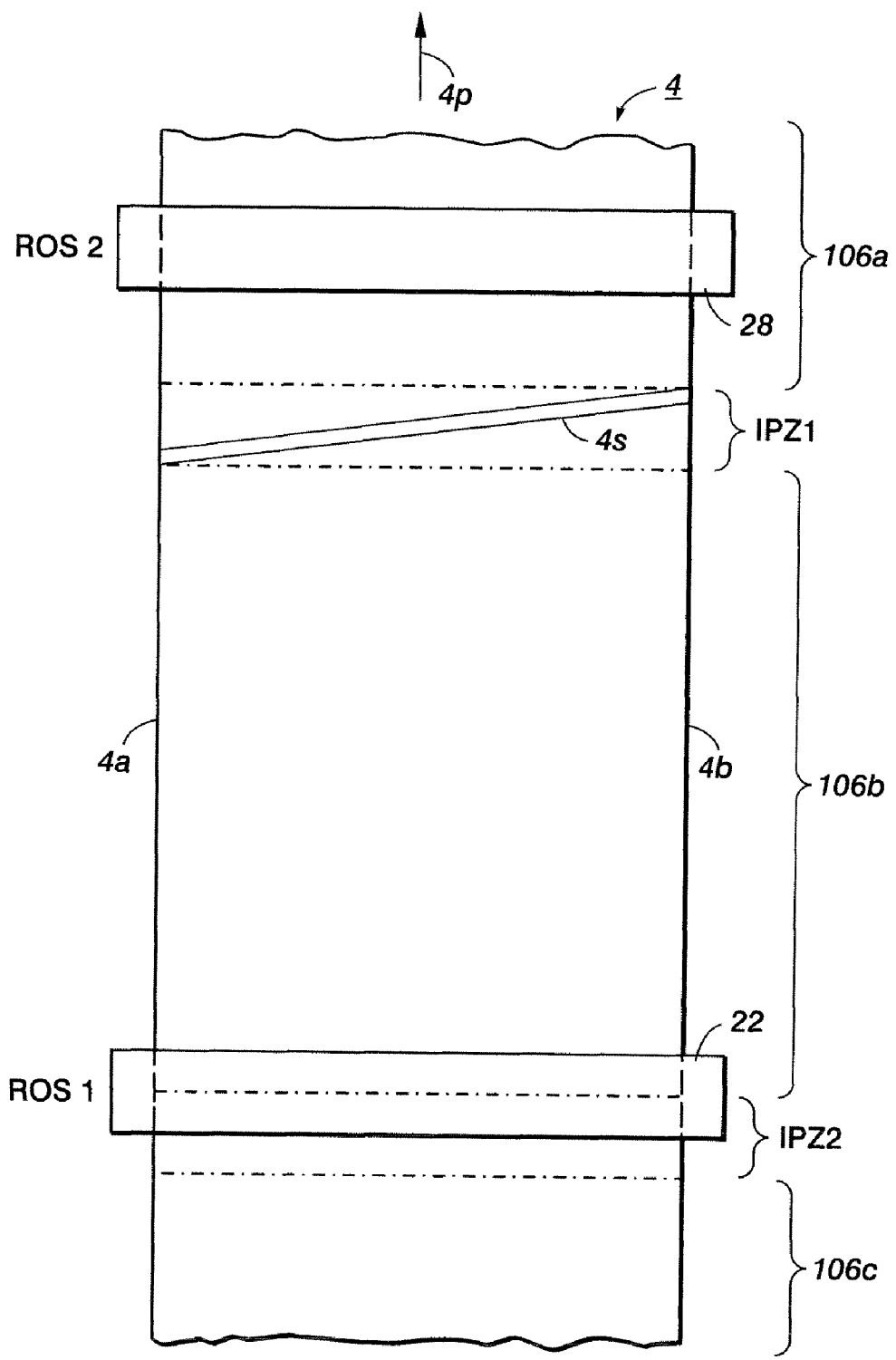
FIG. 2 is a partial top plan view illustrating a portion of the exemplary photoreceptor belt in the system of FIG. 1 with image panel zones separated by inter panel zones.
Figure 3:
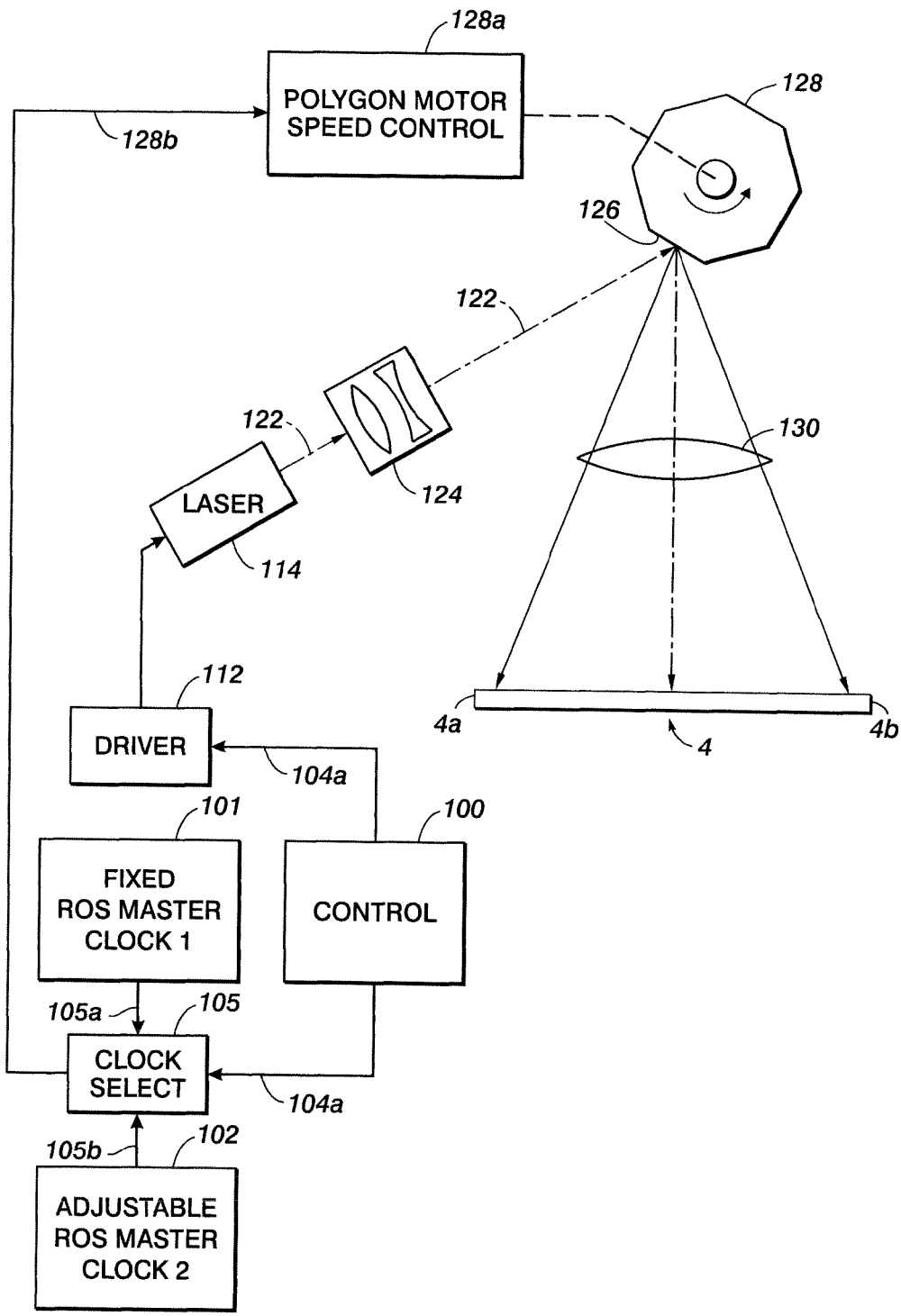
FIG. 3 is a simplified schematic diagram illustrating an exemplary multi-speed ROS in accordance with various aspects of the disclosure.

FIG. 1 illustrates an exemplary multi-color xerographic document processing system 2 including a continuous photoconductive (e.g., photoreceptor) imaging belt 4 having first and second lateral sides 4a and 4b (FIG. 2 below). The photorecptor belt 4 traverses a closed path 4p (counterclockwise in the view of FIG. 1) of a drive assembly 80 having a series of rollers 68 and 70 or bars 8 at a substantially constant speed to move successive portions of its external surface sequentially beneath the various xerographic processing stations disposed about the path 4p in the system 2. Beginning on the right side in FIG. 1, the belt 4 passes through a first charging station 10 that includes a charging device such as a corona generator 20 that charges the exterior surface of the belt 4 to a relatively high, and substantially uniform potential. The charged portion of the belt 4 advances to a first raster output scanner (ROS) type exposure device 22 which image-wise illuminates the charged belt surface to generate a first electrostatic latent image thereon, where FIG. 3 schematically illustrates further details of the exemplary first ROS device 22. The first electrostatic latent image is developed at a development station by developer unit 24 that deposits charged toner particles of a selected first color on the first electrostatic latent image.

Once the toner image has been developed, the photoreceptor belt 4 advances to a recharging station 12 that recharges the belt surface, and a second ROS 28 image-wise illuminates the charged portion of the belt 4 selectively to generate a second electrostatic latent image corresponding to the regions to be developed with toner particles of a second color. The second latent image then advances to a subsequent developer unit 30 that deposits the second color toner on the latent image to form a colored toner powder image of that color on the belt 4. The belt 4 then continues along the path 4p to a third image generating station 14 that includes a charging device 32 to recharge the belt 4 and a ROS exposure device 34 which illuminates the charged portion to generate a third latent image. The belt 4 proceeds to the corresponding third developer unit 36 which deposits toner particles of a corresponding third color on the belt 4 to develop a toner powder image, after which the belt 4 continues on to a fourth image station 16. The fourth station 16 includes a charging device 38 and a ROS exposure device 40 at which the belt 4 is again recharged and a fourth latent image is generated, respectively, and the belt 4 advances to the corresponding fourth developer unit 42 which deposits toner of a fourth color on the fourth latent image. The belt 4 then proceeds to a fifth station 18 that includes a charging device 44 and a ROS 46, followed by a fifth developer 48 for recharging, generation of a fifth latent image, and development thereof with toner of a fifth color.

Thereafter, the photoconductive belt 4 advances the multi-color toner powder image to a transfer station 50 at which a printable medium or substrate, such as paper 52 in one example is advanced from a stack or other supply via suitable sheet feeders (not shown) and is guided along a first substrate media path P1. A corona device 54 sprays ions onto the back side of the substrate 52 that attracts the developed multi-color toner image away from the belt 4 and toward the top side of the substrate 52, with a stripping axis roller 60 contacting the interior belt surface and providing a sharp bend such that the beam strength of the advancing substrate 52 strips from the belt 4. A vacuum transport or other suitable transport mechanism (not shown) then moves the substrate 52 along the first media path P1 toward a fusing station 58. The fusing station 58 includes a heated fuser roller 64 and a back-up roller 62 that is resiliently urged into engagement with the fuser roller 64 to form a nip through which the substrate 52 passes. In the fusing operation and the station 58, the toner particles coalesce with one another and bond to the substrate to affix a multi-color image onto the upper side thereof.

While the multi-color developed image has been disclosed as being transferred from the photoreceptor belt 4 to the substrate 52, in other possible embodiments, the toner may be transferred to an intermediate member, such as another belt or a drum, and then subsequently transferred and fused to the substrate 52. Moreover, while toner powder images and toner particles have been disclosed herein, one skilled in the art will appreciate that a liquid developer material employing toner particles in a liquid carrier may also be used, and that other forms of marking materials may be employed, wherein all such alternate embodiments are contemplated as falling within the scope of the present disclosure.

For single-side printing, the fused substrate 52 continues on the first path P1 to be discharged to a finishing station (not shown) where the sheets are compiled and formed into sets which may be bound to one another and can then be advanced to a catch tray for subsequent removal therefrom by an operator of the document processing system 2.

For two-sided printing, the system 2 includes a duplex router 82 that selectively diverts the printed substrate medium 52 along a second (e.g., duplex bypass) path P2 to a media inverter 84 in which the substrate 52 is physically inverted such that a second side of the substrate 52 is presented for transfer of marking material in the transfer station 50. Absent one or more countermeasures of the present disclosure, the heat introduced into the substrate 52 by the fusing station 58 may cause the substrate 52 to shrink, and if two-sided printing is performed, the duplex router diversion to the second path P2 and media inversion in the apparatus 84 may return the inverted substrate 52 to the transfer station 50 before the substrate 52 can be again acclimated to the ambient temperature, whereby the image is transferred to the second side of the substrate 52 before the substrate 52 returns to its original size, and process magnification error results.

In order to combat this, the system 2 provides multiple ROS clocks including a first clock 101 providing a first clock output signal 101a to the ROSs 22, 28, 34, 40, and 46, and a second clock 102 providing a second clock output signal 102a to the ROSs. The system 2 further includes a controller 100 coupled with the ROSs 22, 28, 34, 40, and 46, which selectively operates a given ROS according to the first clock signal 101a if the latent image being generated by the given ROS is to be fixed to a first side of the substrate 52 or alternatively according to the second clock signal 102a if the latent image being generated by the given ROS is to be fixed to a second side of the substrate 52. The controller 100 may be any suitable form of hardware, software, firmware, programmable logic, or combinations thereof, whether unitary or implemented in distributed fashion in a plurality of components, wherein all such implementations are contemplated as falling within the scope of the present disclosure and the appended claims. The first and second clocks 101 and 102 may directly couple their output signals 101a and 102a to the individual ROSs 22, 28, 34, 40, and 46 or local ROS interface modules (RIMs) thereof as shown, or alternatively, the clocks 101 and/or 102 can be connected indirectly to the ROSs 22, 28, 34, 40, and 46 via one or more intervening components such as the controller 100, or the controller 100 may include one or both of the clocks 101, 102, wherein all such variant implementations as contemplated as falling within the scope of the present disclosure.

The second clock 102, moreover, is preferably adjustable to allow for calibration of the second clock speed to counteract the amount of shrinkage-related side 1 to side 2 process magnification error in a given document processing system 2. In particular, the illustrated embodiments provide for adjustment of the second clock 102 such that a frequency ratio of the first and second clocks 101, 102 corresponds to a side 1 to side 2 process magnification for the system 2 as measured during setup using the first clock 101, where the side 1 to side 2 process magnification is quantified as the ratio of the side 1 image size divided by the side 2 image size using clock 1 to perform two-sided printing of the same image data size to both sides of a substrate 52.

Referring also to FIGS. 2 and 3, the exemplary photoreceptor belt 4 includes a plurality of image panel zones 102 (FIG. 2) in which the ROSs 22, 28, 34, 40, and 46 generate latent images, where three exemplary panel zones 106a, 106b, and 106c are illustrated in the partial view of FIG. 2. Any number of panels 106 may be defined along the circuitous length of the photoreceptor 4, and the number may change dynamically based on the size of the printed substrates 52 being fed to the transfer mechanism 50, where the illustrated belt 4 includes about 11 such zones 106 for letter size paper sheet substrates 52. The panel zones 106 are separated from one another by inter panel zones IPZ, where two exemplary inter panel zones IPZ1 and IPZ2 are shown in FIG. 2, with IPZ1 being defined in a portion of the belt 4 that includes a belt seam 4s. In operation, the controller 100 provides the individual ROSs 22, 28, 34, 40, and 46 with one or more control signals via connections 104, including a control parameter associated with each upcoming image panel zone 106 to indicate whether a latent image to be generated on the upcoming panel zone 106 is to be fixed to a first side or to a second side of the substrate 52. Based on this control parameter, the ROSs 22, 28, 34, 40, and 46 individually select one of the clock output signals 101a, 102a for use in generating a latent image on the upcoming panel zone 106.

As best shown in FIG. 3, further details are schematically illustrated for the first ROS 22, wherein the other ROSs 28, 34, 40, and 46 in the exemplary system 2 are similarly constructed. The ROS system 22 includes a data input 104a from the controller 100 to a driver 112 of a diode laser 114, as well as a clock select parameter input 104a from the controller 100 to a clock select component 105 for selecting between first and second clock inputs 105a and 105b connected to the first and second clocks 101 and 102, respectively. The clock select component 105 selectively couples the output of one of the clocks 101, 102 to a selected clock input connection 128b that is operatively coupled to the clock input of a polygon motor speed control 128a.

In operation of the ROS 22, a stream of image data is provided to the driver 112 associated with a single color portion of a panel image, and the driver 112 modulates a diode laser 114 to produce a modulated light output 122 in conformance with the input image data. The laser beam light output 122 passes into conditioning optics 124 and then illuminates a facet 126 of a rotating polygon 128 having a number of such facets 126 (eight in one example). The light 122 is reflected from the facet 126 through a lens 130 to form a spot on the photosensitive image plane of the passing photoreceptor belt 4. The rotation of the facet 126 causes the spot to sweep across the image plane forming a succession of scan lines oriented in a "fast scan" direction (e.g., generally perpendicular to a "slow scan" or process direction 4p along which the belt 4 travels). Movement of the belt 4 in the slow scan direction 4p is such that successive rotating facets 126 of the polygon 128 form successive scan lines that are offset from each other in the slow scan direction. Each such scan line in this example consists of a row of pixels produced by the modulation of the laser beam 122 as the laser spot scans across the image plane, where the spot is either illuminated or not at various points as the beam scans across the scan line so as to selectively illuminate or refrain from illuminating individual locations on the belt 4 in accordance with the input image data.

In the illustrated example, the ROS system 22 includes the driver 112 and clock select component 105 which together constitute a ROS interface module (RIM) that receives the first and second clock signals from the clocks 101 and 102, where the controller 100 provides the parameter 104a to the RIM in order to indicate to the RIM whether the upcoming panel image is destined for side 1 or side 2 on the final printed substrate 52. This parameter allows the RIM of a given ROS to determine whether or not to switch clocks, and this selective employment of the faster second clock 102 facilitates adaptation of side 2 images to the preshrunk substrate 52 resulting from the duplex routing and inversion following the high temperature fusing in two-sided printing in the document processing system 2. In this regard, the speed of the ROS motor polygon assembly (MPA) 128, along with the speed of the photoreceptor belt 4 determine the overall process magnification of the latent image on the belt, where the belt speed is held substantially constant in the system 2, and the process magnification error is susceptible to substrate size variation resulting from thermal shrinking in the fuser 58 absent the selective dual speed MPA operation of the present disclosure.

It is noted that since there may be multiple panels 106 having images for different substrate sides at any given time, the speed of the belt 4 cannot be changed to address the side 1 to side 2 process magnification errors caused by substrate shrinkage in the fuser 58. Moreover, there are typically more than one ROS generating latent images concurrently, and thus simply changing the speed of a single ROS clock does not provide a solution, since the concurrently generated latent images may be destined for both side 1 and side 2 of the substrate 52 at any given time.

The presently disclosed techniques employ two separate clocks 101 and 102, with the higher speed second clock 102 being used by the ROSs while generating latent images destined for side 2 of the substrate 52. The transition to the second clock 102 in the illustrated embodiment is done during the time when an IPZ is traveling past the ROS, with each ROS being selectively adapted to the appropriate clock 101, 102 independently as the belt 4 continues at a generally constant controlled speed. In the system 2, moreover, the image data synchronization is maintained by providing the first clock signal 101a to the driver 112. Once a ROS has switched to the second clock 102 for driving the MPA 128, the ROS operates to rephase the MPA 128 when a sync signal is received from the first clock 101.

Figure 4:
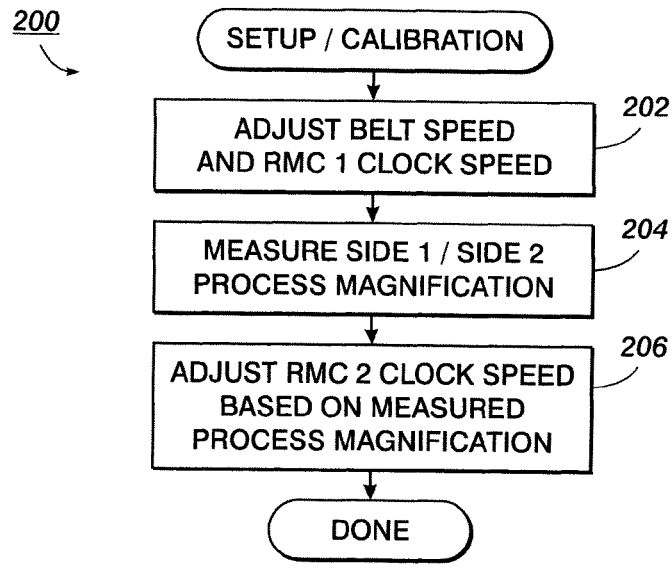
FIG. 4 is a flow diagram illustrating an exemplary setup process in which side 1 to side 2 process magnification is measured and used to adjust the speed of a second ROS clock in accordance with the disclosure.
Figure 5:
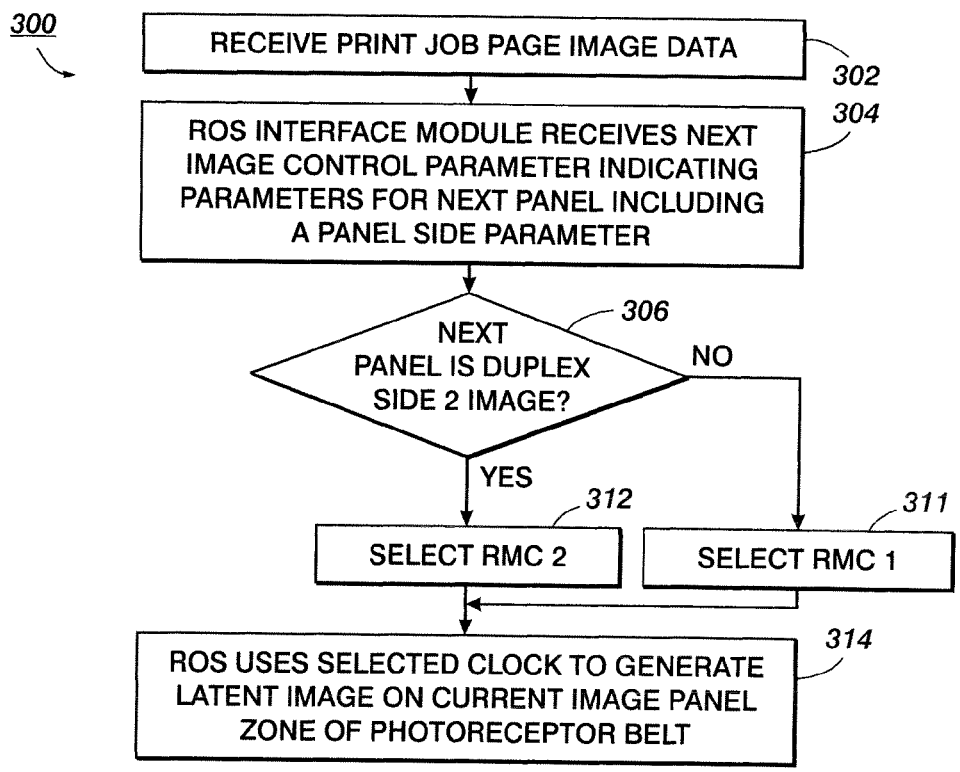
FIG. 5 is a flow diagram illustrating an exemplary duplex printing method in accordance with further aspects of the present disclosure.

Referring to FIGS. 4 and 5, the second clock 102 is preferably adjustable, and its frequency is preferably set relative to that of the first clock 101 to counteract a measured process magnification error performed using the first clock 101. FIG. 4 illustrates an exemplary setup procedure 200 in which the speed of the belt 4 and the first ROS master clock (RMC) 101 may be adjusted at 202. A side 1 to side 2 process magnification is then measured at 204. The measurement at 204 can be any suitable show-thru error measurement in which images are printed onto two sides of a single substrate, preferably by printing the same image data on both sides, such that the process magnification error attributable to fuser shrinkage of the substrate 52 can be quantified. In one embodiment, the process magnification error is characterized at 204 as the side 1 image size divided by the side 2 image size for images printed using image data representing the same image size, to yield a unitless error ratio. At 206, the second clock 102 (RMC 2) speed is adjusted based on the measured process magnification. In one implementation, the clock speed of the second clock 102 is adjusted at 206 such that the frequency ratio of the first and second clocks 101, 102 corresponds to the side 1 to side 2 process magnification for the system 2 measured using the first clock. Thus, for example, a 2% measured process magnification error would yield a side 2 image that is 2% larger than that of side 1, and the second clock 102 would be adjusted at 206 to be 2% faster than the first clock 101.

FIG. 5 illustrates an exemplary process 300 in which the adjusted second clock 102 (and the preset first clock 101) are used in performing duplex printing in the system 2. At 302, print job page image data is received in the system 2, such as in the controller 100. This data can include latent image data for one or more colors (e.g., corresponding to the ROSs 22, 28, 34, 40, and 46 in FIG. 1), where each page data is ultimately destined for printing onto either side 1 or side 2 of the substrate 52. At 304, the controller 100 determines this from the data and sends image control information to each of the ROSs 22, 28, 34, 40, and 46 relating to latent images to be generated in upcoming image panel zones 106 of the photoreceptor belt 4. The individual ROSs receive next image control parameters at 304 that include a panel side parameter indicating whether a latent image to be generated by a given ROS on an upcoming panel zone 106 is to be fixed to a first side or a second side of the substrate 52. The control parameter is preferably provided prior to the end of the IPZ preceding the upcoming panel zone 106, and the method 300 may include allowing the selected clock output signal to settle at 304 prior to generating the latent image in the upcoming image panel zone 106. The RIM of each ROS determines at 306 whether the next image is for the second side, and if not (NO at 306), the first clock (RMC 1) 101 is selected at 311. Otherwise, if the next image is for side 2 (YES at 306), the second clock 102 is selected at 312. The ROS then uses the selected clock at 314 to generate the latent image in the current image panel zone 106 of the photoreceptor belt.

The above examples are merely illustrative of several possible embodiments of the present disclosure, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, software, or combinations thereof, which performs the specified function of the described component (i.e., that is functionally equivalent), even though not structurally equivalent to the disclosed structure which performs the function in the illustrated implementations of the disclosure. In addition, although a particular feature of the disclosure may have been disclosed with respect to only one of several embodiments, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising". It will be appreciated that various of the above-disclosed and other features and functions, or alternatives thereof, may be desirably combined into many other different systems or applications, and further that various presently unforeseen or unanticipated alternatives, modifications, variations or improvements therein may be subsequently made by those skilled in the art which are also intended to be encompassed by the following claims.

The invention claimed is:

1. A document processing system, comprising:
   a photoreceptor that continuously moves along a closed path;
   a plurality of raster output scanners (ROSs) located along the closed path of the photoreceptor, the ROSs individually operable to generate a latent image on a portion of the photoreceptor based on a clock input;
   a first clock providing a first clock output signal to the ROSs;
   a second clock providing a second clock output signal to the ROSs;
   a plurality of developers individually located downstream of a corresponding one of the ROSs and individually operable to develop toner of a given color on the latent image on the photoreceptor;
   a transfer station operative to transfer the developed toner to a substrate traveling along a first substrate path;
   a fusing station for fixing the transferred toner to the substrate;
   a duplex router receiving the substrate from the fusing station and operative to selectively direct the substrate along a second path;
   a media inverter located along the second path and operative to invert the substrate and to return the inverted substrate to the first path upstream of the transfer station; and
   a controller coupled with the ROSs to selectively operate a given ROS according to the first clock signal if the latent image being generated by the given ROS is to be fixed to a first side of the substrate or according to the second clock signal if the latent image being generated by the given ROS is to be fixed to a second side of the substrate;
   wherein the photoreceptor includes a plurality of image panel zones in which the ROSs generate latent images, with successive panel zones separated by inter panel zones, wherein the controller provides the ROSs with a control parameter indicating whether a latent image to be generated on an upcoming panel zone is to be fixed to a first side or a second side of the substrate, and wherein the ROSs individually select one of the clock output signals for use in generating a latent image on the upcoming panel zone based on the control parameter.

2. The system of claim 1, wherein the second clock is adjustable.

3. The system of claim 2, wherein the second clock is adjusted such that a frequency ratio of the first and second clocks corresponds to a side 1 to side 2 process magnification for the system measured using the first clock.

4. The system of claim 1, wherein a frequency ratio of the first and second clocks corresponds to a side 1 to side 2 process magnification for the system measured using the first clock.

5. A duplex printing method, comprising:
   receiving image data for print job pages;
   selectively generating latent images on panel zone portions of a photoreceptor that continuously moves along a closed path using a plurality of raster output scanners (ROSs) positioned along the path, the latent image being generated by a given one of the ROSs by selectively operating the given ROS according to the first clock signal if the latent image being generated by the given ROS is to be fixed to a first side of a substrate or according to the second clock signal if the latent image being generated by the given ROS is to be fixed to a second side of the substrate;
   developing toner of a given color on the latent images on the photoreceptor using a plurality of developers individually located downstream of a corresponding one of the ROSs;
   transferring the developed toner to a substrate traveling along a first substrate path using a transfer station;
   fixing the transferred toner to the substrate using a fusing station;
   for two-sided printing, selectively directing the substrate along a second path using a duplex router; and
   for two-sided printing, selectively inverting the substrate using a media inverter located along the second path and returning the inverted substrate to the first path upstream of the transfer station;
   wherein the photoreceptor includes a plurality of image panel zones in which the ROSs generate latent images, with successive panel zones separated by inter panel zones, further comprising:
   providing a first clock output signal from the first clock to each of the ROSs;
   providing a second clock output signal from the second clock to each of the ROSs;
   providing the individual ROSs with a control parameter indicating whether a latent image to be generated on an upcoming panel zone is to be fixed to a first side or a second side of the substrate; and
   at the individual ROSs, selecting one of the clock output signals for use in generating a latent image on the upcoming panel zone based on the control parameter.

6. The method of claim 5, wherein the control parameter is provided to the individual ROSs prior to the end of the inter panel zones preceding the upcoming panel zone.

7. The method of claim 6, further comprising:
   measuring a side 1 to side 2 process magnification using the first clock; and
   adjusting the second clock based on the measured side 1 to side 2 process magnification.

8. The method of claim 6, wherein a frequency ratio of the first and second clocks corresponds to the measured side 1 to side 2 process magnification.

9. The method of claim 5, further comprising allowing the selected clock output signal to settle before generating the latent image in the upcoming panel zone.

10. The method of claim 9, further comprising:
    measuring a side 1 to side 2 process magnification using the first clock; and
    adjusting the second clock based on the measured side 1 to side 2 process magnification.

11. The method of claim 9, wherein a frequency ratio of the first and second clocks corresponds to the measured side 1 to side 2 process magnification.

12. The method of claim 5, further comprising:
    measuring a side 1 to side 2 process magnification using the first clock; and
    adjusting the second clock based on the measured side 1 to side 2 process magnification.

13. The method of claim 12, wherein the second clock is adjusted such that a frequency ratio of the first and second clocks corresponds to the measured side 1 to side 2 process magnification.

14. The method of claim 5, wherein the second clock is adjusted such that a frequency ratio of the first and second clocks corresponds to the measured side 1 to side 2 process magnification.

* * * * *